United States Patent
Benson et al.

(10) Patent No.: US 12,413,471 B1
(45) Date of Patent: Sep. 9, 2025

(54) SCALABLE NETWORK MONITORING PLATFORM

(71) Applicants: Laurie Benson, Kingsville, MD (US); Casey Flinspach, Las Vegas, NV (US)

(72) Inventors: Laurie Benson, Kingsville, MD (US); Casey Flinspach, Las Vegas, NV (US)

( * ) Notice: Subject to any disclaimer, the term of this patent is extended or adjusted under 35 U.S.C. 154(b) by 0 days.

(21) Appl. No.: 18/378,428

(22) Filed: Oct. 10, 2023

Related U.S. Application Data

(60) Provisional application No. 63/414,611, filed on Oct. 10, 2022.

(51) Int. Cl.
*H04L 41/0816* (2022.01)
*H04L 41/0853* (2022.01)
*H04L 43/0817* (2022.01)

(52) U.S. Cl.
CPC ...... *H04L 41/0816* (2013.01); *H04L 41/0853* (2013.01); *H04L 43/0817* (2013.01)

(58) Field of Classification Search
CPC ............ H04L 41/0816; H04L 41/0853; H04L 43/0817
USPC ....................................................... 709/220
See application file for complete search history.

(56) References Cited

U.S. PATENT DOCUMENTS

| | | | |
|---|---|---|---|
| 5,049,873 A | 9/1991 | Robins | |
| 6,061,725 A | 5/2000 | Schwaller | |
| 7,003,564 B2 * | 2/2006 | Greuel | H04L 41/5009 709/224 |
| 7,685,316 B2 * | 3/2010 | Sukumaran | H04L 41/0843 709/218 |
| 8,635,319 B1 | 1/2014 | Cuthbert | |
| 10,003,493 B2 | 6/2018 | Kim | |
| 10,979,335 B2 | 4/2021 | Li | |
| 11,258,653 B1 * | 2/2022 | Waldbusser | H04L 43/0817 |
| 2011/0302652 A1 | 12/2011 | Westerfeld | |
| 2015/0081891 A1 * | 3/2015 | Baba | G06F 21/105 709/224 |
| 2017/0187587 A1 | 6/2017 | Keppel | |
| 2019/0028363 A1 | 1/2019 | McBride | |
| 2019/0286500 A1 * | 9/2019 | Tucker | G06F 9/542 |
| 2020/0393807 A1 * | 12/2020 | Muranaka | G05B 19/052 |
| 2021/0194782 A1 | 6/2021 | Jump | |
| 2021/0273953 A1 | 9/2021 | Fellows | |
| 2021/0282224 A1 | 9/2021 | Kanitkar | |
| 2023/0379300 A1 * | 11/2023 | Chundury | H04L 63/0236 |

* cited by examiner

*Primary Examiner* — Ruolei Zong
(74) *Attorney, Agent, or Firm* — Goldstein Law Offices, P.C.

(57) ABSTRACT

A scalable monitoring platform for use with a target network having a network management device and multiple managed devices. The platform includes a remote monitoring server and a monitoring device co-located with the target network. The monitoring device is configured to communicate directly with the managed devices using a network management protocol, and to retrieve management data using separately generated and transmitted targeted requests to each managed device. Each managed device transmits a response and each response is evaluated to identify changes in host status or service status indicative of an adverse condition. Dynamic monitoring policies are implemented in response to the changes and management actions are executed in response to adverse conditions.

8 Claims, 12 Drawing Sheets

| |
|---|
| Managed Device Data: Moisture Sensor |
| Address Data |
| Device Network Address |
| Device-Level Identifier: Water Content Sensor |
| Data Descriptor: Moisture Level |
| Device-Level Identifier: Temperature Sensor |
| Data Descriptor: Temperature Reading |
| Device-Level Identifier: Network Adapter |
| Data Descriptor: Connectivity Data |
| Data Descriptor: Serial Number |
| Evaluation Criteria |
| Authentication Information |
| Physical Location Descriptor |

| |
|---|
| Evaluation Criteria |
| Standard Ranges |
| Warning Ranges |
| Critical Ranges |
| Data Conversion |
| Thresholds |

*FIG. 3A*

SCALABLE NETWORK MONITORING PLATFORM

CROSS-REFERENCE TO RELATED APPLICATIONS

This application is a nonprovisional utility application of provisional patent application, Ser. No. 63/414,611 filed in the United States Patent Office on Oct. 10, 2022, claims priority therefrom, and is expressly incorporated herein by reference in its entirety.

TECHNICAL FIELD

The present disclosure relates generally to a system for monitoring a network to detect adverse conditions. More particularly, the present disclosure relates to a scalable monitoring platform utilizing targeted requests directed to individual network elements to achieve rapid and accurate detection of adverse conditions.

BACKGROUND

Network management systems play a critical role in monitoring the health of computer networks, by detecting faults and errors affecting a network, assessing the operational state of individual devices within the network, and collecting performance data related to tasks carried out individually by the managed devices. Typically, conventional management systems retrieve management data through mass polling of all the managed devices within the network, and produce a single aggregated data output containing the data returned by every managed device. The aggregated data output is collected and stored by a single device or computer on the network acting as a manager. This aggregated data output may be referred to as a data dump.

The conventional approach is hampered by several key drawbacks which increase in severity as networks grow in scale and complexity. When a manager polls one of the managed devices, the managed device will react by transmitting all of the data that it is configured to collect, resulting in the transmittal and recording of much irrelevant data. Furthermore, conventional management systems will poll every managed device on the network in order to produce the aggregated data output, often in a sequential fashion hampered by delayed responses, timeout errors, and general network congestion. In certain cases, timeout errors may cause the manager to repeat the entire polling process, thus potentially creating frequent gaps in the collected data in which adverse conditions or events go undetected. In addition, the lengthy amount of time required to complete the polling process produces data which may be stale by the time analysis and review can begin.

Furthermore, expanding the number of managed devices will increase the size of the aggregated data output, thus increasing the cost of analysis as computing resources are devoted to reviewing and processing ever-increasing amounts of irrelevant data in order to spot events or identify trends.

It is therefore clear that an urgent need exists for a monitoring platform which overcomes obstacles to scalability through targeted requests directed to individual managed devices for specific management data items. Such requests will be generated independently and transmitted in a simultaneous manner, thus avoiding the delays and loss of data incurred using conventional polling techniques. Furthermore, each targeted request utilizes management commands native to the network management protocol of network, and causes the managed device to reply by promptly transmitting a response containing only the management data items specified by the request. Such responses will be evaluated upon receipt using algorithms specific to the managed device, resulting in rapid and accurate evaluation of the management data.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions, or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a scalable platform capable of monitoring any number of devices within a target network comprising a plurality of managed devices and a network management device. The network management device and the managed devices are adapted to communicate via a network management protocol. Each managed device is configured to provide management data, including host data describing functional conditions of the managed device, and service data describing a service task which the managed device is configured to carry out. Accordingly, the present disclosure provides a scalable monitoring platform for monitoring the target network, comprising a monitoring device and a remote monitoring server. The monitoring device is co-located with and communicates directly with the target network, and is configured to request a management data item from each managed device by transmitting a targeted request directed to each managed device. The targeted requests are generated and transmitted separately or in parallel using management commands native to the network management protocol, and incorporate address data obtained via the network management protocol allowing precise targeting of managed devices. Each managed device replies independently to the targeted request by transmitting the requested management data item. By transmitting targeted requests for individual data items separately at different times or in a synchronous, parallel manner, the scalable monitoring platform avoids bottlenecks and timeouts which hamper scalability of conventional monitoring systems.

It is another aspect of an example embodiment in the present disclosure to provide a scalable platform capable of rapidly detecting adverse conditions related to the functional condition or service task condition of individual managed devices. Accordingly, the scalable monitoring platform utilizes a data evaluation module configured to assess each management data item separately using evaluation criteria specific to the managed device. Targeted requests are directed to individual items of host data or service data from the managed device, and the data evaluation module evaluates each data item upon receipt. This allows the data evaluation module to detect changes to the functional condition or service task condition of each managed device without delays caused by transmission and evaluation of irrelevant data. Furthermore, the evaluation criteria contains a plurality of ranges which allow the data evaluation module to assess severity of adverse conditions indicated by the management data.

It is yet another aspect of an example embodiment in the present disclosure to provide a scalable platform capable of dynamically scheduling requests in reaction to changes in functional condition or service task condition of the managed devices. Accordingly, the scalable monitoring platform is configured to execute monitoring policies for each managed device, and each monitoring policy has a standard operating mode and one or more adverse operating modes. If the data evaluation module detects an adverse changes to the functional condition or service condition of a managed device, the monitoring policy for the managed device switches to one of the adverse operating modes. The adverse operating mode causes the request module to generate additional targeted requests at increased frequency to verify the adverse condition. Furthermore the scalable monitoring platform is adapted to initiate management actions to notify users of adverse conditions, and initiate mitigating device-level actions by the managed devices, such as reboots.

It is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 3A is a block diagram showing an example set of managed device data and evaluation criteria, in accordance with an embodiment in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
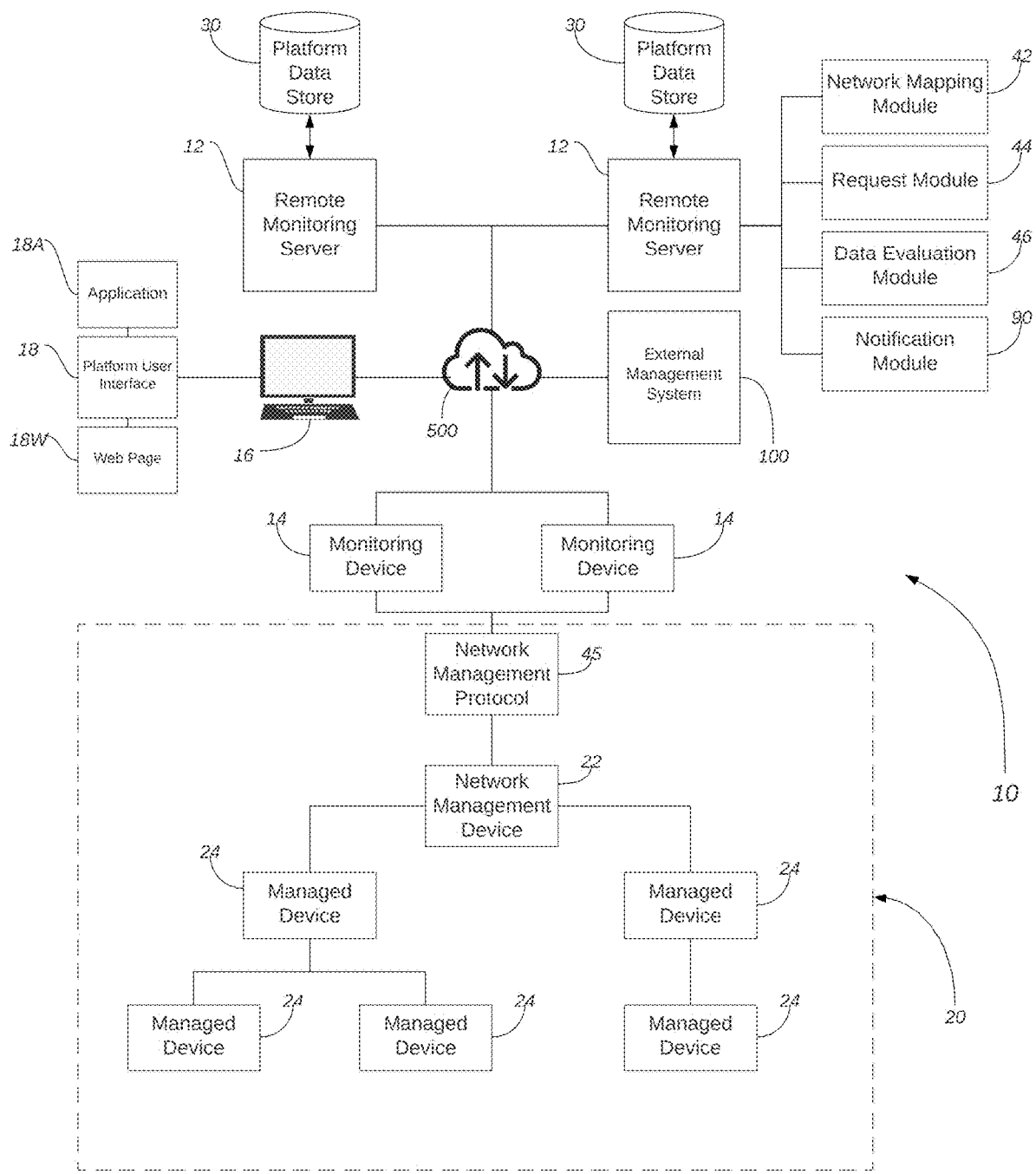
FIG. 1A is block diagram depicting a remote monitoring platform and a target network with a network management device and plurality of managed devices, in accordance with an embodiment in the present disclosure.
Figure 1B:
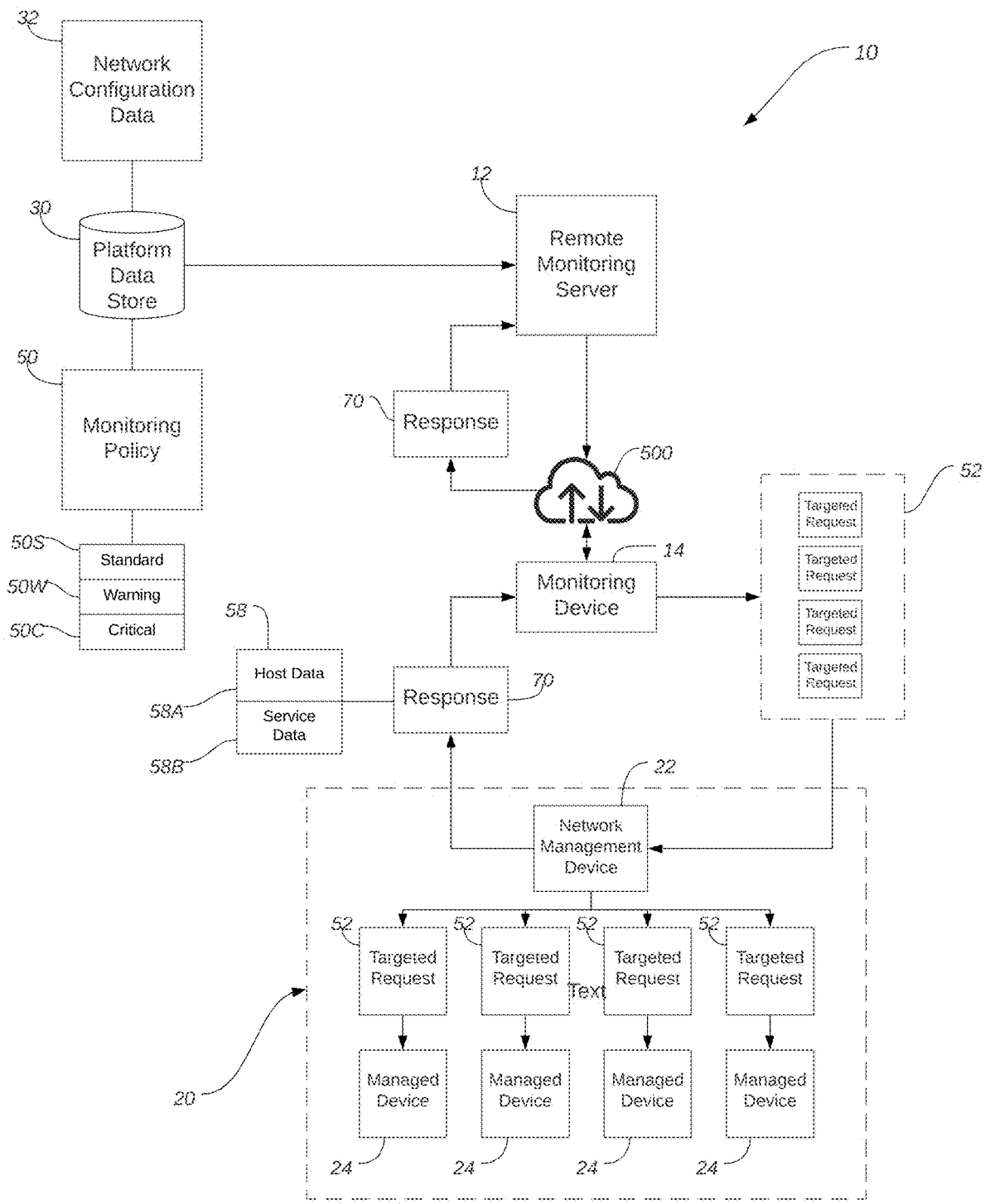
FIG. 1B is a block diagram depicting a plurality of targeted requests being transmitted to the managed devices, as well as responses containing management data transmitted in reply by the manage devices, in accordance with an embodiment in the present disclosure.

FIGS. 1A-B illustrate a scalable monitoring platform 10 for managing one or more target networks 20. In a preferred embodiment, the scalable monitoring platform 10 comprises one or more monitoring devices 14 locally positioned in relation to one of the target networks 20, one or more remote monitoring servers 12 configured to communicate with the monitoring devices 14, and at least one platform data store 30. The scalable monitoring platform 10 may also comprise one or more user devices 16 and a platform interface 18 which allow a user to interact with the scalable monitoring platform 10. Each user device 16 may correspond to a personal computer, mobile phone, or other computing device capable of accepting user commands, displaying text and graphics within a graphical user interface, and communication via the internet 500. The platform interface 18 may be implemented as an application 18A on the user device 16 or within a platform web page 18W. In some embodiments, the scalable monitoring platform 10 is further configured to communicate with an external management system 100.

Each target network 20 corresponds to an open or closed network comprising a network management device 22 and a plurality of managed devices 24, whereby the network management device 22 and the managed devices 24 communicate using a network management protocol 45. The network management protocol 45 may be implemented at the application layer to provide a common set of management commands and database schema for storing and using management data 58.

In a preferred embodiment, the monitoring device 14 is configured to communicate directly with the target network 20 using the network management protocol 45. In addition, the monitoring device 14 is configured to communicate with the remote monitoring server 12 and exchange platform data via a wide area network 500 (WAN) such as the Internet. In certain embodiments, the target network 20 may be deployed within a network site corresponding to a geographic location, such as a building or portion thereof, an outdoor area, or other location with defined boundaries. The monitoring device 14 may therefore be deployed within the network site.

The network management device 22 is operably linked to the managed devices 24 within the target network 20, and is adapted to transmit management commands to each of the managed devices 24 using the network management protocol 45. Each of the managed devices 24 is adapted to respond to such management commands by transmitting a response 70 containing management data 58. In a preferred embodiment, each managed device 24 is configured as a host within the target network 20, and is adapted to perform one or more service tasks.

The scalable monitoring platform 10 is configured to retrieve management data 58 from the target network 20 by sending targeted requests 52 to each of the managed devices of the target network 20 via the network management device 22. The network management device 22 will promptly relay the targeted request 52 to the managed device 24. In one embodiment, these targeted requests 52 are transmitted from the remote monitoring server 12 to the network management device 22 through the monitoring device 14. The targeted request 52 is then relayed to the managed device 24 by the network management device 22. In other embodiments, the targeted request 52 may instead originate from the monitoring device 14.

Each targeted request 52 may be addressed to a single managed device 24, and may specify one or more items of management data 58. The management data 58 may comprise host data 58A, service data 58B, or a combination thereof. The host data 58A provides information regarding one or more functional conditions of the managed device 24, while the service data 58B provides information regarding the service tasks performed by the managed device 24. For example, the host data 58A may indicate whether the managed device 24 is operating normally and is able to communicate with the target network 20, while the service data 58B is used to monitor and evaluate the service task condition. Upon receiving the targeted request 52, the managed device 24 with reply with a response 70 containing the requested management data 58. The response 70 will be transmitted by the network management device 22 to the monitoring device 14, and will then be relayed to the remote monitoring server 12 for evaluation.

Each targeted request 52 is transmitted independently, and each managed device 24 will reply with a response 70 separately from other managed devices 24 within the target network 20. Furthermore, the remote monitoring platform 10 may transmit any number of targeted requests 52 to any number of managed devices 24 within the target network 20, limited by only by network and processing capacity of the target network 20, monitoring device 14, and the network management device 22.

Note that in an alternate embodiment, certain network management protocols 45 may allow the monitoring device 14 to transmit targeted requests 52 directly to managed devices 24 within the target network 20 without relaying the request through a network management device 22. In such an alternative embodiment, the targeted requests 52 and resulting responses 70 may be exchanged directly between the monitoring device 14 and the corresponding managed devices 24.

In a preferred embodiment, the scalable monitoring platform 10 is configured to monitor each managed device 24 in accordance to one or more monitoring policies 50. The management data 58 contained within the response 70 transmitted by each managed device 24 is evaluated, and the monitoring policy 50 may be adjusted if trends, degradation, or adverse conditions are identified as a result of the evaluation. Furthermore, the remote monitoring platform 10 maintains a data log 78 within the platform data store 30 for each target network 20 which records the values of the management data 58 received from each managed device 24. The data log 68 may correspond to a time series database containing the value of each instance of management data 58 along with timing information and metadata to facilitate visualization and analysis.

Figure 2A:
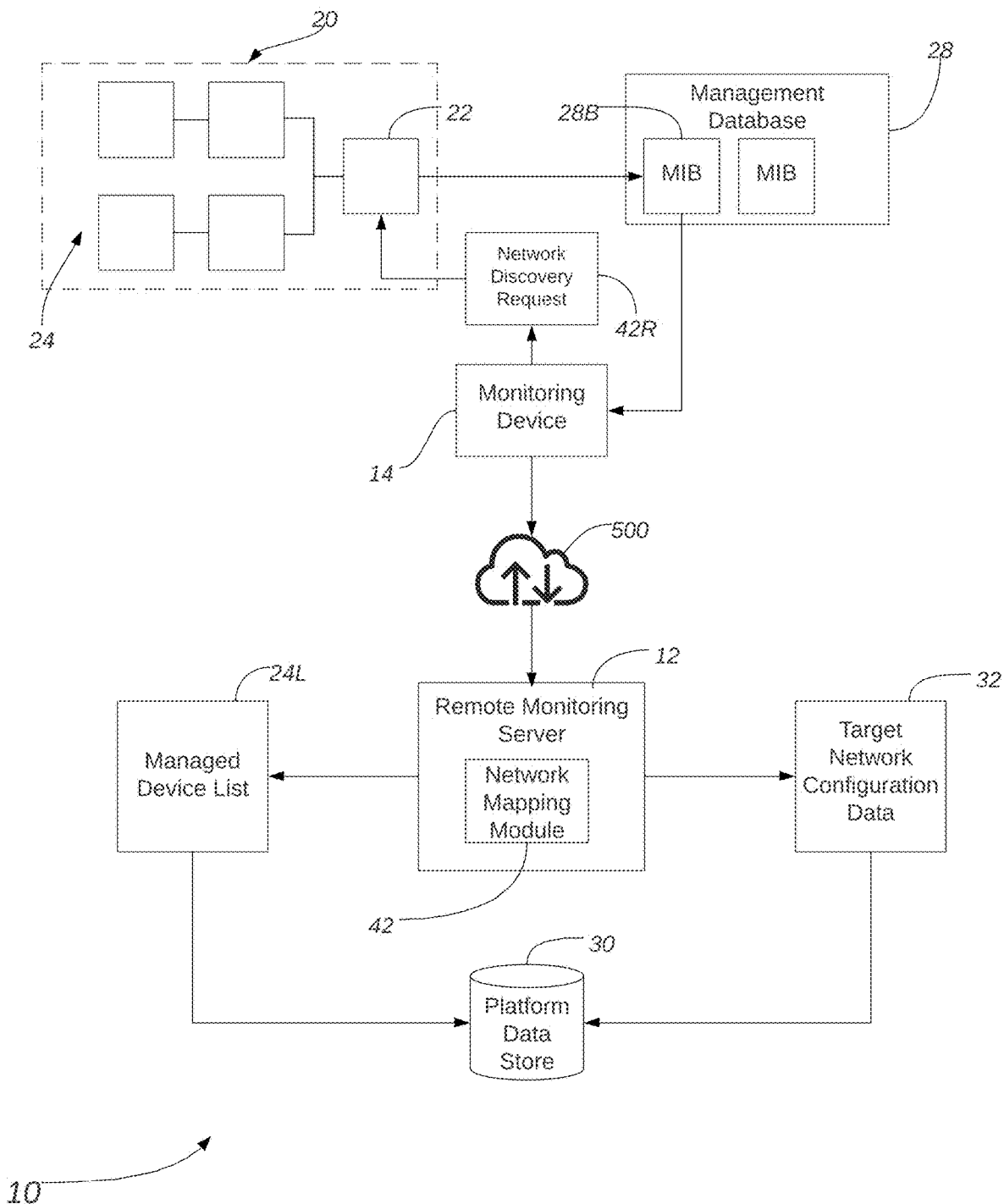
FIG. 2A is block diagram showing a network mapping module retrieving network configuration data from the target network, in accordance with an embodiment in the present disclosure.
Figure 2B:
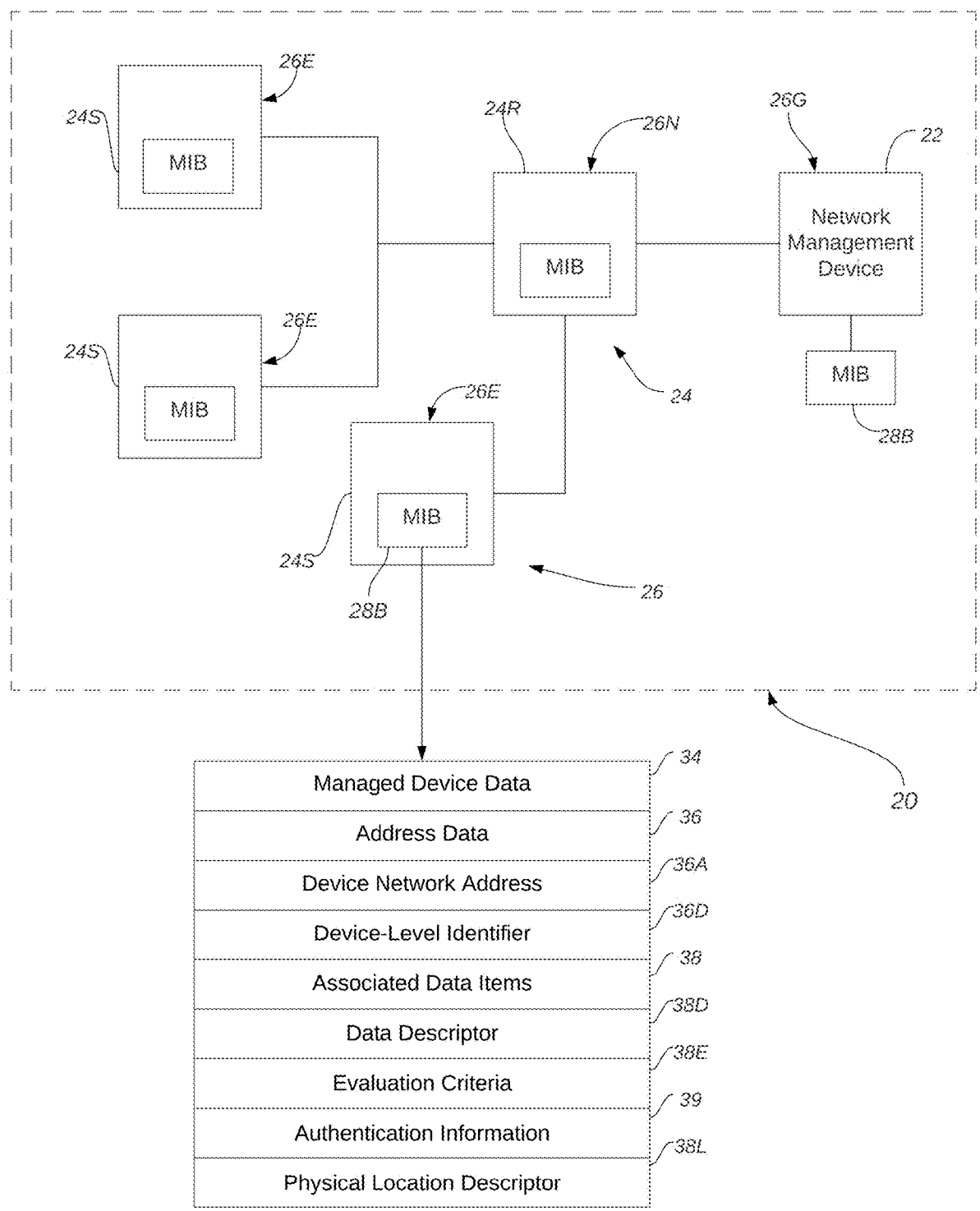
FIG. 2B is block diagram showing an example network map of the target network, and managed device data which allows the remote monitoring platform to locate and communicate with each manage device, in accordance with an embodiment in the present disclosure.

Referring to FIG. 2B while also referring to FIGS. 1A-B, the network management device 22 and the managed devices 24 each correspond to one of a plurality of nodes 26 within the target network 20, and the physical and logical relationship of the nodes 26 may be described using a network topology or network map. In certain embodiments, the network management device 22 corresponds to a gateway node 26G while the managed devices 24 each correspond to a network node 26 within the target network 20. The managed devices 24 are disposed downstream of the network management device 22, and the network management device 22 controls access to each of the managed devices 24 from sources which are external to the target network 20.

In one embodiment, the target network 20 is configured as a localized network in which the network management device 22 and the managed devices 24 are operably linked via a wired medium or via a wireless communication protocol. Each managed device 24 corresponds to an electronic device which is capable of communicating over the target network 20 with other managed devices and the network management device 22. In one purely illustrative example, four managed devices 24 are configured downstream of the network management device 22 acting as the gateway node 26G. The managed devices 24 include a router 24R configured as an intermediate node 26N downstream of the gateway node 26G, with three other managed devices 24 configured as end nodes 26E downstream of the router 24R.

In one embodiment, the monitoring device 14 is directly connected to the target network 20 via the network management device 22. To facilitate a direct wired or wireless connection between the monitoring device 14 and the target network 20, the monitoring device 14 may be deployed on-site with target network 20, thus allowing the monitoring device 14 to communicate with the network management device 22 via the network management protocol 45 of the target network 20. The monitoring device 14 is an edge device simultaneously configured to communicate with the remote monitoring server 12 via the wide area network 500.

Each managed device 24 may correspond to a personal computer, terminal, switch, router, server, sensor, camera, antenna-equipped transmission device, or other networked device, while the network management device 22 corresponds to a computing device configured to transmit a query for electronic data from the managed devices 24 via the management commands provided by the network management protocol 45. In one example, the managed devices 24 include a plurality of antennae-equipped devices which allow the targeted network 20 to function as a Distributed Antenna System (DAS) for providing wireless network access within a building or other geographic location. In yet another example, the managed devices 24 include a plurality of moisture sensors distributed at physical locations throughout a golf course.

The host data 58A returned by each of the managed devices 24 may be used to indicate whether the managed device 24 is in operational or inoperable functional condition. For example, the host data 58A may represent a variety of information related to the operational status of the managed device 24, such as power, network connectivity, battery, and other indicators as appropriate. The service data 58B is used to quantify one or more service tasks associated with the managed device 24. For example, the service data 58B may include moisture reading data from moisture sensors embedded within the soil of the golf course, or signal strength or network traffic data readings transmitted by the DAS units.

In one embodiment, the network management protocol 45 may be implemented as a version of Simple Network Management Protocol (SNMP), and the network management device 22 corresponds to a network management station (NMS) operating an SNMP Manager application. Each of the monitored devices 24 may be configured to operate an SNMP Agent application which allows the managed device 24 to receive and respond to data queries transmitted by the network management device 22 using the management commands provided through the network management protocol 45. Note that the features of the remote monitoring platform 10 can be applied using alternate management protocols as will be apparent to a person of ordinary skill in the art in the field of the invention.

Figure 1C:
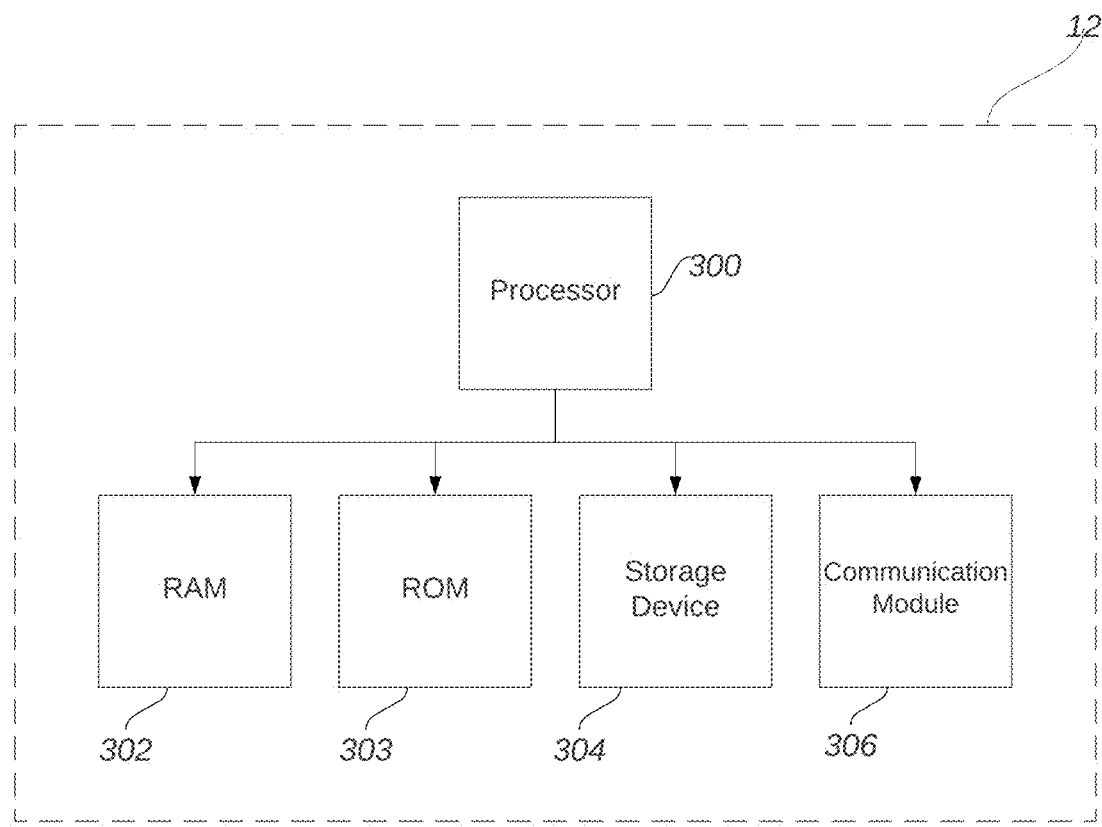
FIG. 1C is block diagram depicting an example remote monitoring server, in accordance with an embodiment in the present disclosure.
Figure 1D:
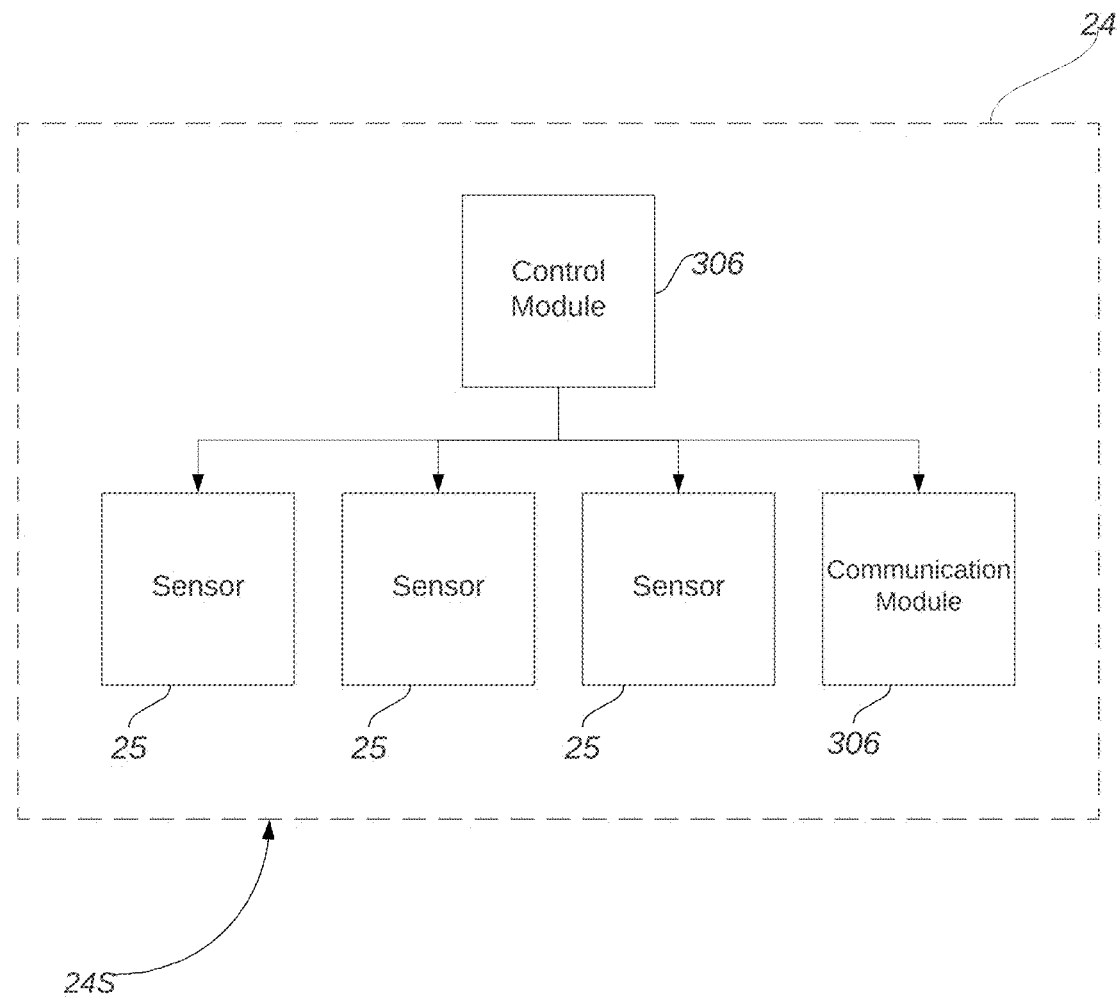
FIG. 1D is block diagram depicting an example managed device and subcomponents, in accordance with an embodiment in the present disclosure.

Turning to FIGS. 1C-D while also referring to FIGS. 1A-B, the remote monitoring server 12 is adapted to execute a plurality of platform functions which allow the scalable monitoring platform 10 to communicate with and monitor multiple target networks 20. The remote monitoring server 12 also allows each of the monitoring devices 14 to be commanded or configured remotely. The remote monitoring server 12 is configured as a computing device having a processor 300, a RAM 302, a ROM 303, a computer storage device 304, and a communication module 305. The communication module 305 is configured to communicate with the monitoring devices 14 and user devices 16 via the WAN 500. In a preferred embodiment, the remote monitoring server 12 may be implemented using server hardware with sufficient processing power to carry out the necessary platform functions. In certain embodiments, the functions of the remote monitoring server 12 may be distributed or duplicated across multiple computing devices. The platform data store 30 may be maintained within the computer storage device 304 of the remote monitoring server 12, or within a computer storage device 304 contained within a separate computing device which is accessible to the remote monitoring server 12. Note that in certain embodiments, the monitoring devices 14 may be configured as computing devices with capabilities similar to the remote monitoring server 12, allowing certain platform functions to be executed locally by the monitoring device 14 at the network site of the target network 20.

Figure 5:
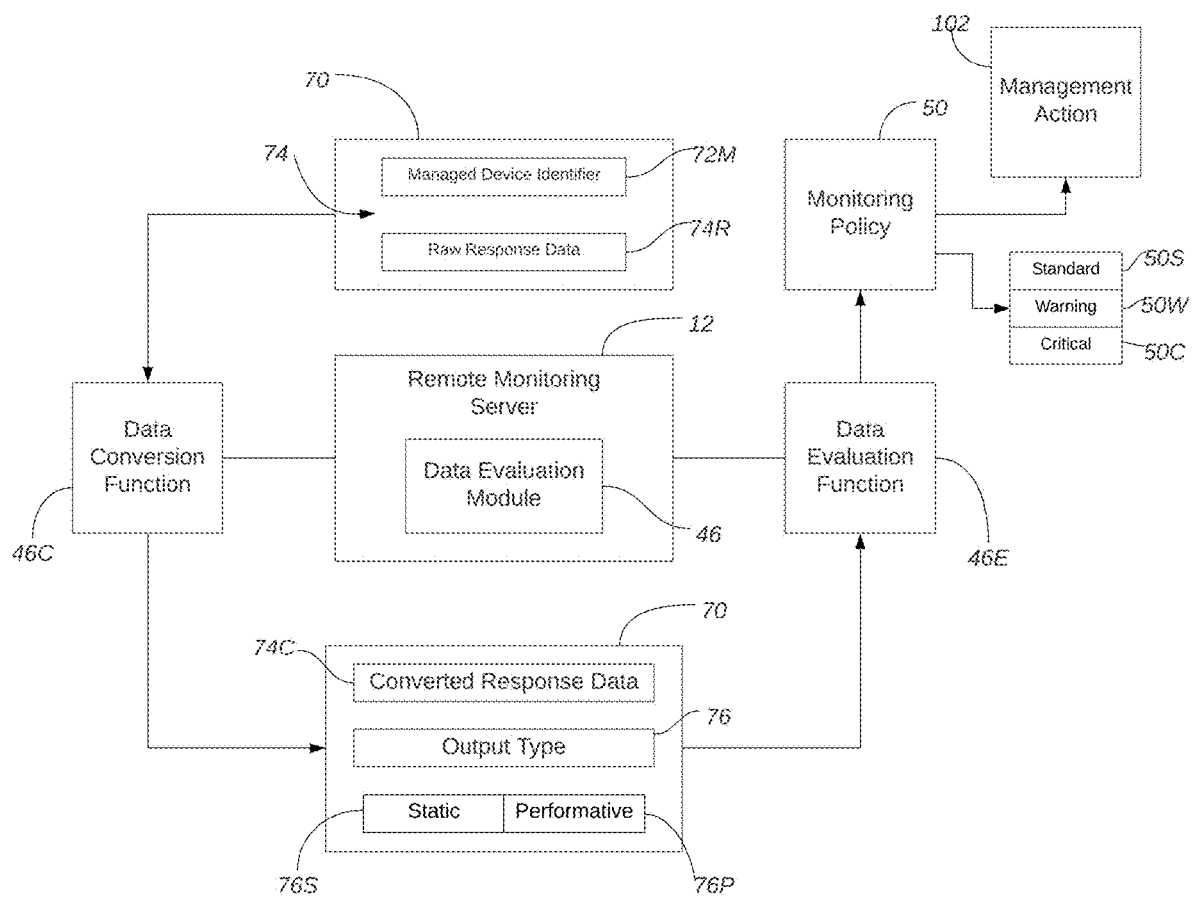
FIG. 5 is a block diagram depicting a data conversion function and data evaluation function of the data evaluation module, in accordance with an embodiment in the present disclosure.
Figure 7:
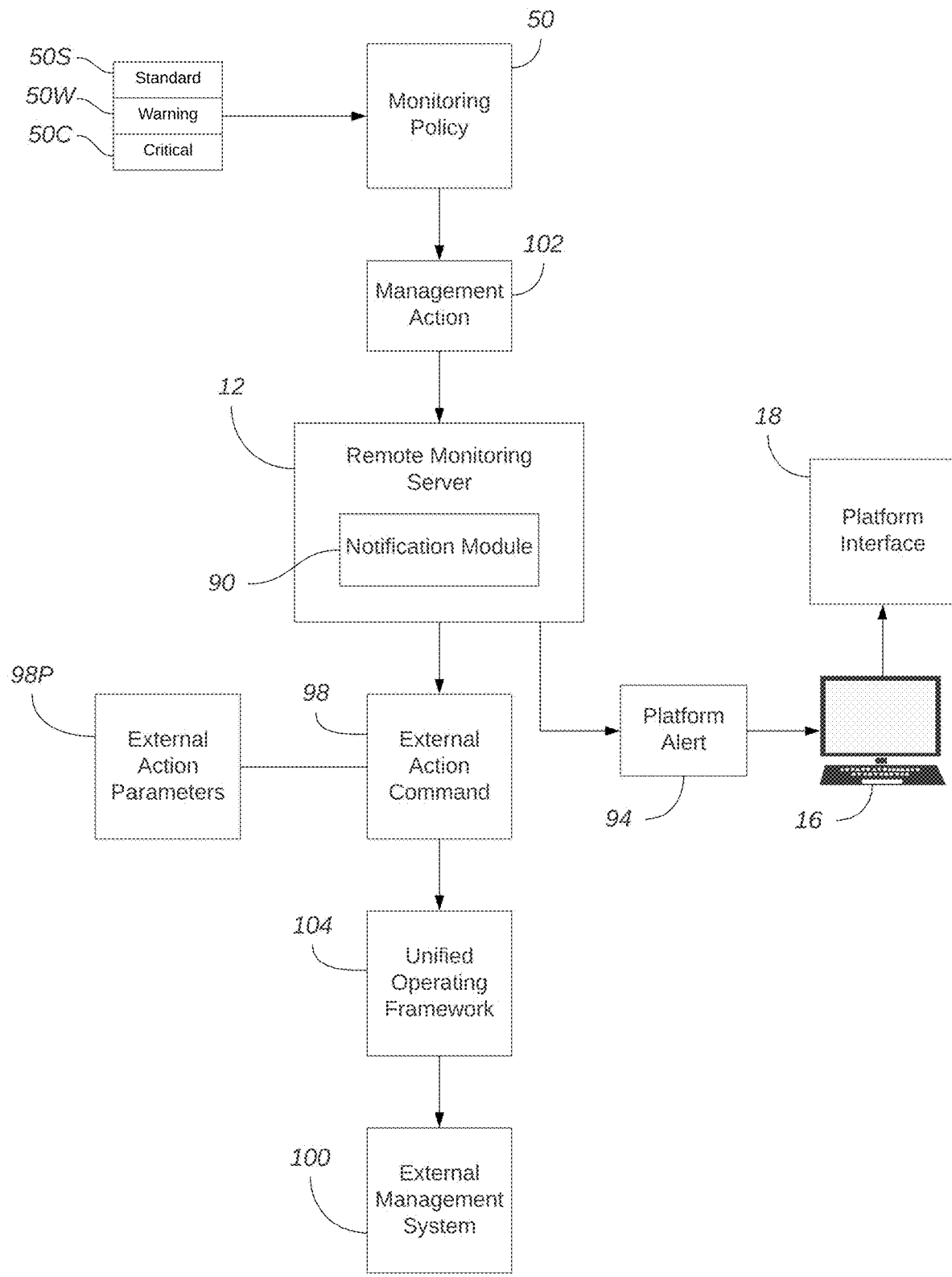
FIG. 7 is a block diagram showing management actions being carried out by a notification module, further showing external action commands transmitted to an external management system, in accordance with an embodiment in the present disclosure.

Referring to FIGS. 2A-B and FIG. 5 while also referring to FIGS. 1A-C, the remote monitoring server 12 has a plurality of platform modules adapted to carry out the various platform functions. These platform modules may be implemented using software components, packages, or assemblies, as will be apparent to a person of ordinary skill in the art in the field of the invention. In one embodiment, the modules comprise a network mapping module 42, a request module 44, a data evaluation module 46, and a notification module 90. In one embodiment, the network mapping module 42 is adapted to identify the active network management protocol 45 used by the target network 20, retrieve target network configuration data 32 from the target network 20, and define a managed device list 24L which references the managed devices 24 present within the target network 20. The request module 44 is adapted to generate targeted requests 52 which are compatible with the network management protocol 45, in accordance with the monitoring policies 50. The data evaluation module 46 is adapted to interpret and evaluate the management data 58 transmitted by each managed device 24, and initiate a management action 102 in reaction to the evaluation of the management data 58. Referring briefly to FIG. 7, in one embodiment, the management actions 102 may include displaying a platform alert 94 using the platform interface 18, as well as transmitting an external action command 98 to an external management system 100. Note that in certain embodiments, certain functions of the platform modules may be executed from the monitoring device 14, while other functions are executed remotely by the remote monitoring server 12.

Referring to FIGS. 1C-D while also referring to FIGS. 1A-B and FIGS. 2A-B, each network management device 22 is a network capable computing device operably linked to each of the managed devices 24 of the target network 20, and may be implemented using server-grade hardware capable of processing a high volume of data from a large number of managed devices 24. The managed devices 24 may be implemented using various computing devices or network capable systems each configured to receive and respond to management commands using the network management protocol 45. For example, a managed device 24 configured as a sensing unit 24S may have a control module 306, one or more subcomponents 25 (such as sensors), and a communication module 305 for communicating with other managed devices 24 and the network management device 22. The control module 306 is configured to operate the subcomponents 25 and may also be configured to monitor the functional condition of the managed device 24.

Referring to FIGS. 2A-B, FIGS. 1A-B, and FIG. 1D, the network mapping and discovery module 42 is configured to retrieve the target network configuration data 32 of the target network 20. In certain embodiments, the network management protocol 45 may provide a network discovery function which reveals the managed devices 24, and which may also be used to identify the network topology or network map of the target network 20. Furthermore, the target network configuration data 32 contains sufficient data to allow the remote monitoring server 12 to identify each of the managed devices 24 and generate a managed device list 24L for the target network 20. In one embodiment, the remote monitoring server 12 may transmit a network discovery request 42R to the target network 20 via the monitoring device 14, whereupon the target network configuration data 32 is in turn relayed to remote management server 12.

In one example where SNMP is the active network management protocol 45, the target network configuration data 32 is stored within a management database 28 maintained by the network management device 22, and which contains one or more Management Information Base files (MIB) 28B. Each MIB 28B contains data which reveals the hierarchical order and arrangement of the managed devices 24 within the target network 20. Each managed device 24 is referenced using a unique identifier, such as an Object Identifier (OID), which further serves as an address for the managed device 24 within the target network 20. SNMP uses a standardized system of notation in which each OID comprises an ordered list of components. Each component within the OID may be used to identify a characteristic of the managed device 24, such as the vendor or manufacturer, equipment type, as well as subcomponents 25 which are responsible to collecting particular items of management data 58. The MIB 28B may further define the data types and ranges of the management data 58 associated with the managed device 24.

The information present within the management database 28 associated with each managed device 24 is used to populate a set of managed device data 34 which will be used by the scalable monitoring platform 10 to communicate with the managed device 24. The managed device data 34 may contain address data 36 which allows targeted requests 52 to be directed to the management device 22 using management commands compatible with the network management protocol 45 of the target network 20. The managed device data 34 also defines one or more associated data items 38 of the managed device 24, each corresponding to an item of host data 58A or service data 58B. The address data 36 may comprise a device network address 36A which identifies or locates the managed device 24 within the target network 20, and one or more device-level identifiers 36D each associated with one of the associated data items 38. In one embodiment, the device-level identifier 36D may be combined with the device network address 36A to reference a specific item of host data 58A or service data 58B of the managed device 24. The address data 36 may be retrieved by locating and parsing the OID of the managed device 24 within the appropriate MIB file 28B, and the device-level identifiers 36D may correspond to particular components of the OID.

The OID may also be used to store information such as a physical location linked to the managed device 24 or one of its associated data items 38. For example, the physical location 38L may correspond to a specific location within the network site at where the managed device 24 is physically installed, or a location which is monitored by one of the subcomponents 25 of the managed device 24. Therefore, the managed device data 34 of a managed device 24 may be populated with a physical location descriptor 38L using the information present within the OID and the MIB 28B.

Each associated data item 38 is linked to evaluation criteria 38E which allows the management data 58 to be evaluated by the scalable monitoring platform 10. In a preferred embodiment, the evaluation criteria 38E linked to each associated data item 38 includes ranges or thresholds 38ET against which the value of the host data 58A or service data 58B may be compared to determine the functional condition or service task condition as appropriate.

Each associated data item 38 may further be linked to a data descriptor 38D which describes the associated data item 38 to facilitate organization and ease of analysis. In certain embodiments, the MIB 28B associated with each managed device 24 may be populated with labels which identify each of the OID components. In other embodiments, the platform data store 30 may be configured with a repository of known MIB configurations which allow the remote monitoring server 12 to identify the OID components of each managed device 24 and reference the appropriate data descriptor 38D and evaluation criteria 38E.

The managed device data 34 may also contain authentication information 39 applicable to the target network 20 or the managed device 24, such as encryption and login information. Such authentication information 39 may be utilized by the request module 44 to generate the targeted request 52.

Turning to FIG. 3A while also referring to FIG. 1B, FIG. 1D, and FIG. 2B, an example set of managed device data 34 linked to a managed device 24 configured as a moisture sensor is shown. The address data 36 includes a device network address 36A which allows the managed device 24 to be referenced on the target network 20, along with a plurality of device level identifiers 36D each linked to one of the associated data items 38 of the managed device 24. In the present example, the managed device 24 is configured to monitor moisture and temperature at a physical location within the network site. One of the associated data items 38 is linked to a device level identifier 36D which addresses a subcomponent 25 labeled as "Water Content Sensor", and has a data descriptor 38D of "Moisture Level". A second associated data item 38 is linked to a device level identifier 36D which addresses a subcomponent labeled as "Temperature Sensor", and has a data descriptor 38D of "Temperature Reading". The associated data items of "Moisture Level" and "Temperature Reading" each correspond to service data 58B, and are associated with evaluation criteria 38E. In one example, the evaluation criteria 38E may identify a range of data values for a plurality of service ranges comprising a standard range 38ES, a warning range 38EW, and a critical range 38EC. The standard range 38ES denotes data values which indicate the service task condition is in normal or acceptable condition, while the warning range 38EW and the critical range 38EC denote data values which indicate an adverse service task condition of increasing severity. Note that the evaluation criteria 38E for each associated data item 38 may include more or fewer service ranges than illustrated in the present example.

The managed device data 34 may further describe an associated data item 38 having a data descriptor of 38D "Connectivity Data", which is linked to a device level identifier 36D which addresses a subcomponent 25 or communication module 305 labeled as "Network Adapter". In the present example, the data descriptor 38D of "Connectivity Data" corresponds to host data 58A used to determine the functional condition of the managed device, and may be used to evaluate whether the managed device 24 is effectively communicating with the target network 20. In one example, the evaluation criteria 38E may correspond to a threshold vale 38ET.

Multiple instances of functionally identical managed devices 24 may be distinguished by device network address 36A, or by a unique identifier implemented as an associated data item 38, such as a serial number.

Figure 3B:
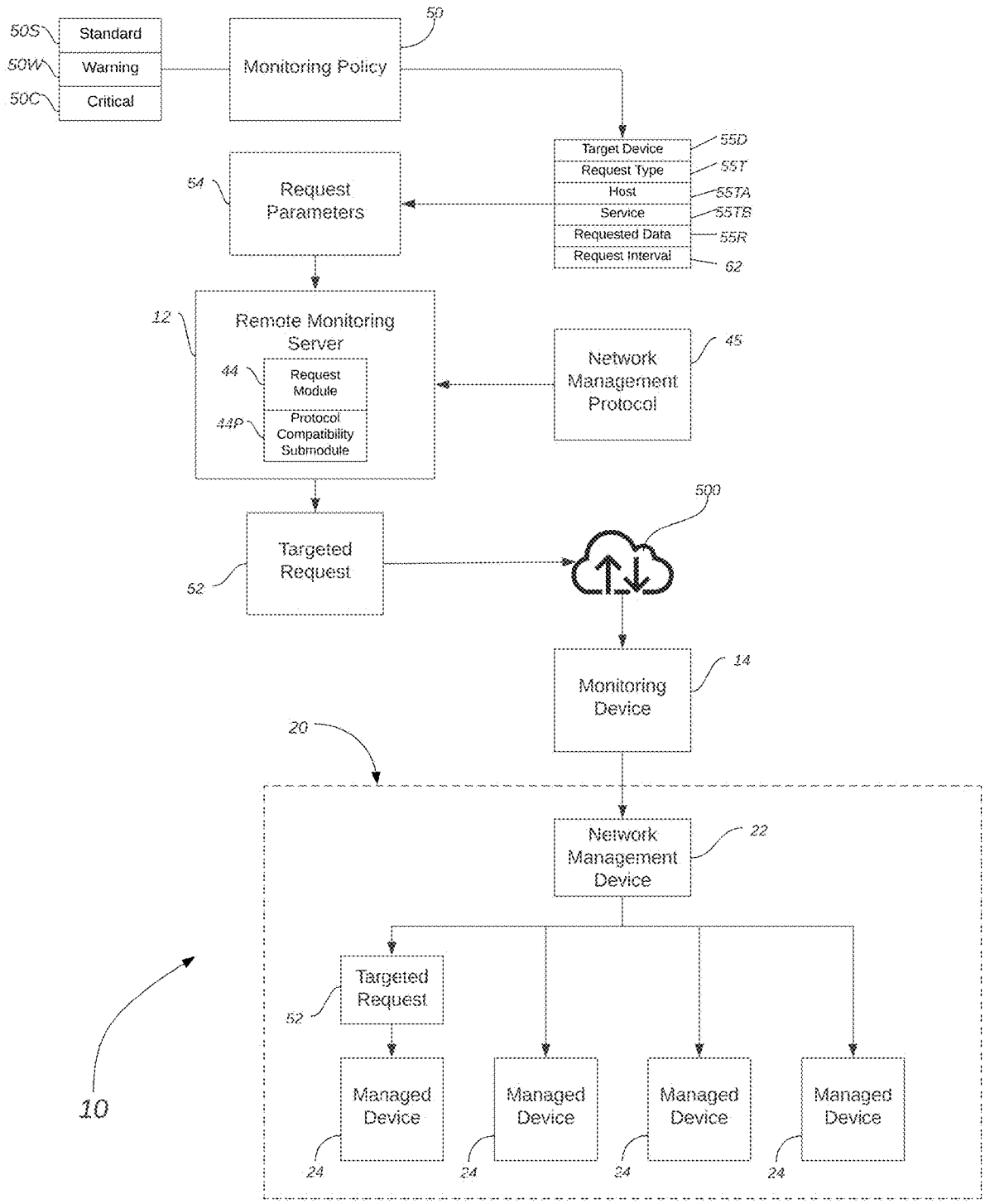
FIG. 3B is a block diagram showing targeted requests being generated using request parameters determined by a monitoring policy, in accordance with an embodiment in the present disclosure.

Turning to FIG. 3B while also referring to FIG. 1A, FIGS. 2A-B and FIG. 3A, the scalable monitoring platform 10 is configured with one or more monitoring policies 50 which are applicable to managed devices 24 within the managed device list 24L of the target network 20. Each monitoring policy 50 may be associated with one or more managed devices 24, and each monitoring policy 50 may be configured with separate rules or evaluation criteria 38E for monitoring and evaluating each of the associated data items 38 of the managed device 24. For example, a monitoring policy 50 associated with a managed device 24 having three associated data items 38 may have distinct evaluation criteria 38E for each of the three associated data items 38.

In one embodiment, each monitoring policy 50 is configured to cause the request module 44 to generate targeted requests 52 using a variety of request parameters 54. In one embodiment, the request parameters 54 may comprise a target device 55D corresponding to one of the managed devices 24, a request type 55T which can be formed as a host status request 55TA or a service status request 55TB, and a requested data item 55R corresponding to one of the associated data items 38 of the targeted managed device 24. The monitoring policy 50 may further define a request interval 62, which governs timing and/or frequency of the targeted request 52.

Furthermore, each monitoring policy 50 may have a plurality of operating modes. In one embodiment, the operating modes may comprise a standard operating mode 50S, and one or more adverse operating modes corresponding to a warning operating mode 50W and a critical operating mode 50C. In one embodiment, each monitoring policy 50 begins operation in the standard operating mode 58S by default. The scalable monitoring platform 10 utilizes the monitoring policies 50 to dynamically generate targeted requests 52 directed to the appropriate managed devices 24 in reaction to changes in functional conditions and service task conditions as expressed within the management data 58. The request interval 62 may be shortened or lengthened depending on the current operating mode of the management policy 50.

Targeted requests 52 and any corresponding responses 70 are transmitted independently, and responses 70 are evaluated and recorded promptly upon receipt. Therefore, the quantity and frequency of targeted requests 52 do not increase the risk of data loss resulting from timeout errors. As such, the request intervals 62 may be shortened to minimize the risk of adverse conditions remaining undetected due to gaps in the retrieval, evaluation, and logging of management data 58.

The monitoring policy 50 associated with each managed device 24 may be predefined and stored within the platform data store 30, and may further be customized or edited by a user via customization tools provided within the platform interface 18. Such customizations and edits may be transmitted to the remote monitoring server 12. The remote monitoring server 12 may then relay the modified monitoring policies to the monitoring device 14 co-located with the appropriate target network 20 for local implementation. In certain embodiments where the monitoring device 14 is configured to perform the functions of the request module 44, the monitoring policies 50 associated with the target network 20 may be stored locally using the monitoring device 14.

Each monitoring policy 50 allows the scalable monitoring platform 10 to monitor and evaluate the host condition and service task condition of the managed device 24 through targeted requests 52 generated in accordance with the request interval 62. The monitoring policy 50 may assign a separate request interval 62 for each associated data item 38 of the targeted managed device 24, thereby allowing the targeted requests to 52 to be timed to reflect the type of the management data 58 being requested, the current functional condition of the managed device 24, the nature of the service tasks performed by the managed device 24, or any adverse events reflected in the management data 58.

In one example, a managed device 24 may be an outdoors moisture sensor configured to collect service data 58B corresponding to localized moisture levels and temperature readings on a golf course. The monitoring policy 50 associated with this managed device 24 may be configured to schedule targeted requests 52 for service data 58A at relatively long request intervals 62, such as one request every five minutes, while requests for host data 58A may be scheduled at relatively short request intervals 62, such as one request every 30 seconds. In the present example, shifts in moisture levels and temperature occur relatively infrequently, while the functional condition of the managed device 24 itself must be regularly monitored. In certain embodiments, request intervals 62 may be linked to a particular series of times or time intervals to facilitate consistent and ordered logging of management data 58. For example, all requests with a five minute request interval 62 may be generated at the times of "12:00, 12:05, 12:10 . . . ". Targeted requests 52 scheduled for the same time or time interval may therefore be generated and transmitted simultaneously in a synchronous manner.

In a preferred embodiment, the monitoring policies 50 are protocol-agnostic, and a monitoring policy 50 configured for use with a particular managed device 24 may still be applied to multiple target networks 20 each implementing different network management protocols 45. In one embodiment, the request module 44 utilizes a protocol compatibility submodule 44P to translate the request parameters 54 into a format compatible with the target network 20 and its corresponding network management protocol 45. The protocol compatibility submodule 44P may be configured to match the network management protocol 45 utilized by the target network 45 to a plurality of known network management protocols 45, populate the request parameters 54 using the managed device data 34, and then combine the address data 36 with the appropriate management command native to the appropriate network management protocol 45. The protocol compatibility submodule 44P may be configured to select and utilize management commands from a range of network management protocols 45 with which the scalable monitoring platform is intended to be compatible.

Referring to FIGS. 3A-B and FIGS. 2A-B, in one example, the protocol compatibility submodule 44P allows the request module 44 to generate a target request 52 to retrieve a requested data item 55R via SNMP. After identifying SNMP as the network management protocol 45, the protocol compatibility submodule 44P may select the appropriate management command from within the SNMP protocol, and then identify the device network address 36A of the managed device 24 and the device level identifier 36D of the requested data item 55R using the MIB file 28B. The request module 44 may then use the identified address data 36 to produce the SNMP management command to retrieve the requested data item 55R from the appropriate managed device 24. The targeted request 52 is then transmitted to the target network 20 for delivery to the managed device 24.

Figure 4:
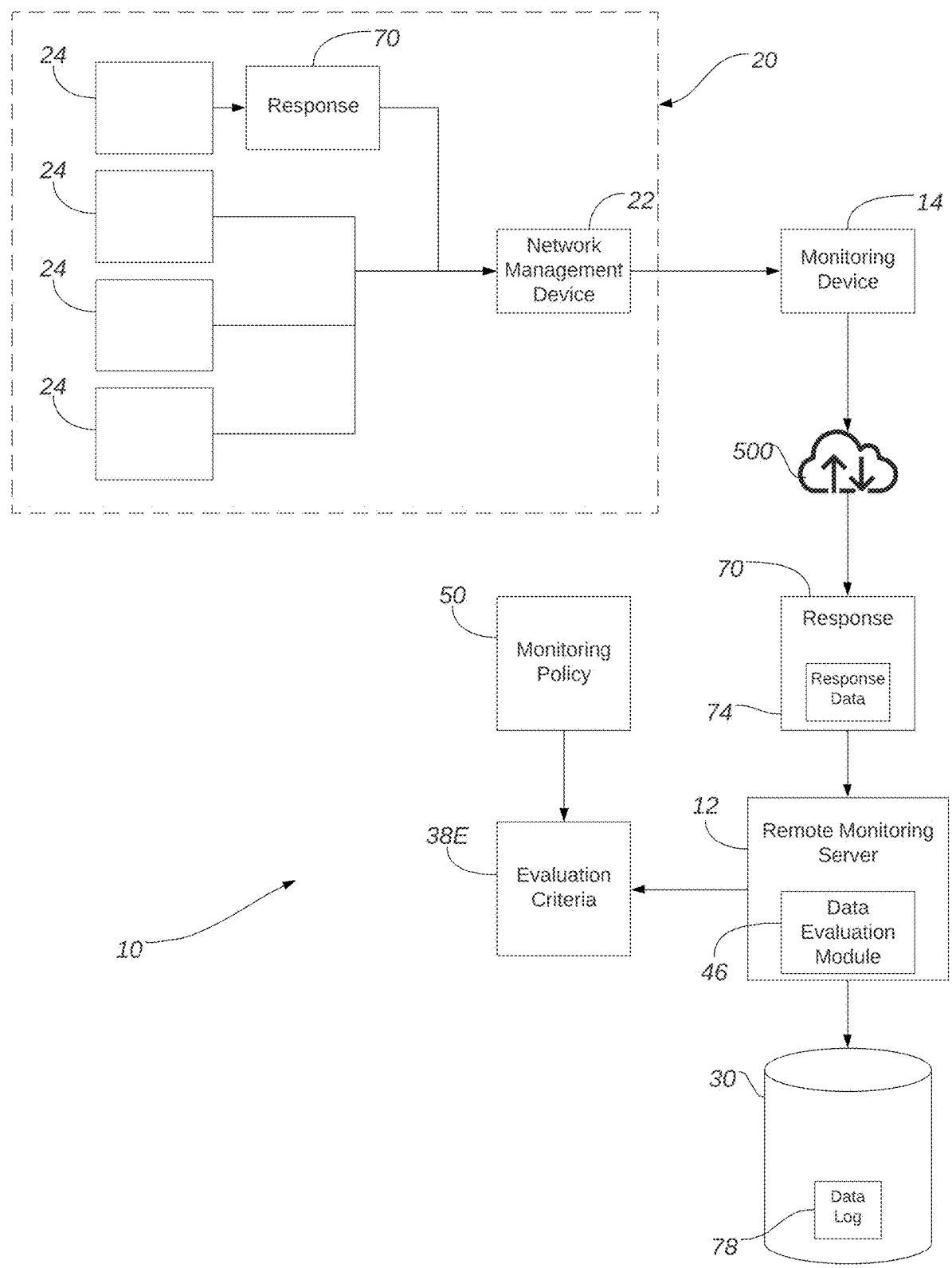
FIG. 4 is block diagram showing response data being passed to a data evaluation module, in accordance with an embodiment in the present disclosure.

Turning to FIGS. 4 and 5 while also referring to FIG. 1B, FIGS. 2A-B and FIGS. 3A-B, each managed device 24 which receives a targeted request 52 will reply by transmitting a response 70 containing response data 74. The response data 74 corresponds to the requested data item 55R of the targeted response 52, and embodies management data 58 which may be host data 58A or service data 58B. In one embodiment, the response 70 is transmitted to the monitoring device 14 via the network management device 22, whereupon the response data 74 is relayed to the remote monitoring server 12 for evaluation by the data evaluation module 46. In certain embodiments, the data evaluation module 46 may be implemented on the monitoring device 14 as well as on the remote monitoring server 12, thus allowing for the response data 74 to be evaluated locally at the network site, thus avoiding delays in evaluation which may be incurred during transmission of the response data 74 to the remote monitoring server 12 via the internet 500.

The data evaluation module 46 performs a data evaluation function 46E using evaluation criteria 38E specified by the monitoring policy 50 of the managed device 24. The value of the response data is evaluated to determine whether the value of the data represents a change to the functional condition or service task condition of the managed device 24, by comparing the value against the standard range 38ES within the evaluation criteria 38E, as well as any other ranges which indicate the presence or likelihood of an adverse condition, such as the warning range 38EW or critical range 38EC.

In certain embodiments, the response data 74 comprises raw response data 74R which must be converted before evaluation can occur. For example, the managed device 24 may be configured to generate management data in the form of octet strings, which cannot be directly compared against evaluation criteria 38E expressed using ranges of integer values. The data evaluation module 46 is therefore adapted to perform a data conversion function 46C to convert the raw response data 74R into a standardized format which enables direct comparison against the evaluation criteria 38E. In certain embodiments, the evaluation criteria 38E may contain data conversion information 38EV which identifies the correct data type to which the raw response data 74R will be converted. The data conversion function 46C may therefore produce converted response data 74C which is standardized for use with protocol-agnostic monitoring policies 50.

Figure 6:
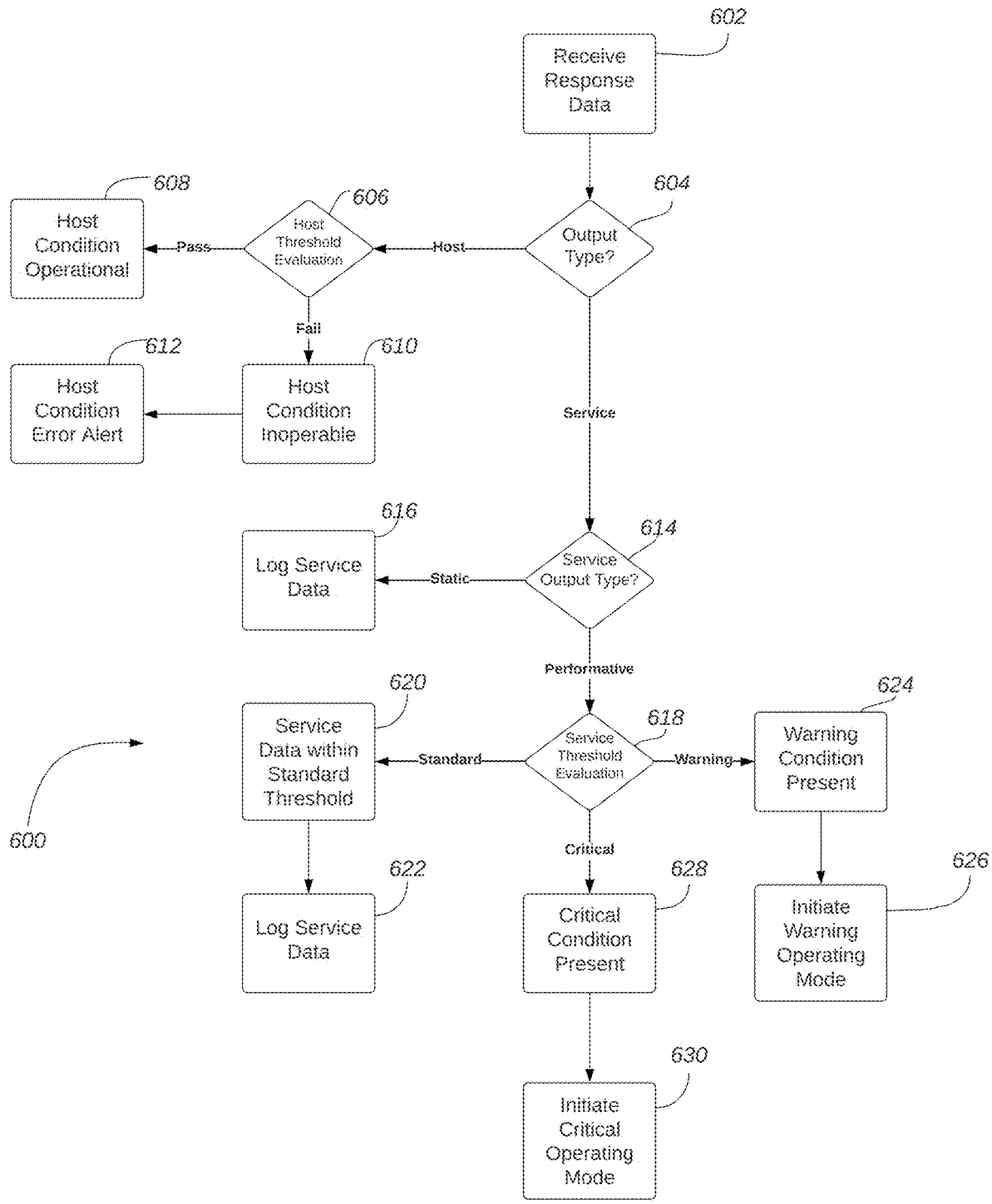
FIG. 6 is a flowchart depicting an example data evaluation process, in accordance with an embodiment in the present disclosure.

Turning to FIG. 6 and FIGS. 4-5, while also referring to FIG. 1B, FIG. 2B, and FIGS. 3A-B, an exemplary data evaluation process 600 is shown. Note that the steps within the exemplary process may be reordered or removed and additional steps may be included, while remaining consistent with the principles set forth within the present disclosure.

At step 602, a response 70 from one of the managed devices 24 is received by the data evaluation module 46. Where necessary, the raw response data 74R is converted to produce converted response data 74C. Next, at step 604, the data evaluation module 46 determines whether the management data 58 corresponds to host data 58A or service data 58B in order to categorize the response 70 by output type 76. In one embodiment, the monitoring policy 50 of the managed device 24 contains classifications which identify the output type 76 of each associated data item 38 of the managed device 24, and indicate whether the associated data item 38 corresponds to host data 58A or service data 58B. Furthermore, the output type 76 may also indicate whether the data is treated as static data 76S or performative data 76P.

If the response 70 contains host data 58A, the data evaluation module 46 performs a host threshold evaluation at step 606 to assess the functional condition of the managed device 24. In one embodiment, the host threshold evaluation is performed using a threshold comparison in which the value of the host data 58A is compared against one or more threshold values 38ET. Threshold values 38ET may be configured in various ways depending on the managed device 24, and each threshold value 38ET may be used to indicate whether the value of the management data 58 signifies a change in the functional condition of the managed device. Each managed device 24 may be assigned a host condition corresponding to an operational host condition or an inoperable host condition. In an example, the host data 58A item may correspond to a power amplification measurement in which a data value falling below the threshold value 38ET indicates that the managed device 24 is producing insufficient power to function. As such, the data evaluation module 46 may determine that the managed device 24 is in the inoperable host condition at step 610, and proceed to generate a host condition error alert at step 612. Conversely, if the host threshold evaluation at step 606 determines that the value of the host data 58A is above the threshold value 38ET, the data evaluation module 46 determines that the managed device 24 is in the operational host condition at step 608.

In certain embodiments, the data evaluation module 46 may be configured to detect whether an excepted response 70 to a targeted request 52 formed as a host status request 55TA has not been received. In one embodiment, the data evaluation module 46 may determine that a response failure has occurred after a period of time corresponding to a response failure interval has passed. The data evaluation module 46 may proceed with the data evaluation function 46E on the assumption that the managed device is in the inoperable host condition. In certain embodiments, the host condition of any nodes 26 of the target network which are positioned upstream of the managed device 24 may be evaluated to determine if any of the intermediate nodes 26N have failed, thus preventing communication with the managed device 24.

Returning to step 604, if the management data 58 corresponds to service data 58B, the data evaluation module 46 will determine if the output type 76 indicates the data is static data 76S or performative data 76P at step 614. Service data 58B which is static data 76S does not require evaluation, and may be simply forwarded to the platform data store 30 for storage within the data log 78 at step 616. One example of static data 76S may include a serial number assigned to the managed device 24 which may be used to for inventory control purposes. Other examples of static data 76S include physical location, firmware information, and other types information of descriptive or informative value.

If the service data 58B corresponds to performative data 76P, the data evaluation module 46 will perform a service threshold evaluation at step 618 using the evaluation criteria 38E linked to the associated data item 38 contained in the response 70. The service threshold evaluation allows the data evaluation module 46 to determine whether the service data 58B indicates if the condition of the service task is within normal levels, or if an adverse condition exists. In a preferred embodiment, each item of service data 58B is evaluated against the standard range 38ES, the warning range 38EW, and the critical range 38EC.

The data evaluation module 46 compares the value of the service data 58B to each of the service ranges at step 618 as part of the service threshold evaluation. If the value of the service data 58B falls within the standard range 38ES, the data evaluation module 46 will determine that no adverse service task condition is present at step 620. No change to the operating mode of the monitoring policy is required, and the monitoring policy 50 continues to operate in the standard operating mode 50S. The value of the service data 58B will also be logged with the appropriate timing data for storage within the data log 78.

If the value of the service data 58B falls within the warning range 38EW, the data evaluation module 46 will determine that a warning condition is present at step 624, and the monitoring policy 50 for the managed device 50 will begin operating in the warning operating mode 50W at step 626. In one embodiment, the warning range 38EW identifies data values of the service data 58B which indicate an intermediate level of risk or adverse impact.

If the value of the service data 58B falls within the critical range 38EC at step 618, the data evaluation module 46 will determine that a critical condition is present at step 628, and initiate the critical monitoring mode 50C of the monitoring policy 50 for the managed device 24 at step 630. The critical range 38EC may identify data values of the service data 58B which indicate a high level of risk or adverse impact.

The data evaluation module 46 may also be configured to detect changes in management data 58 which constitute patterns or trends. For example, the data evaluation module 46 may be configured to detect if the values of service data 58B returned by a managed device 24 approach an adverse range at recurring times.

The data evaluation module 46 may also be configured to detect degradation in the management data 58 and initiate a change to an adverse operating mode of the monitoring policy 50. For example, a managed device 24 may return service data 58B with values which fall within the standard range 38ES but which steadily increase or decline towards the values constituting the warning range 38EW. As a result, the data evaluation module 46 may initiate the warning operating mode 50W for the managed device 24 before the service data 58B actually falls within the warning range 38EW.

In one embodiment, the warning operating mode 50W of a monitoring policy 50 may cause the request module 44 to increase the quantity and frequency of targeted requests 52 sent to any managed device 22 subject to a warning condition, such as by adjusting the request interval 62 within the request parameters 54. If the service data 58B represents an erroneous reading, increasing the frequency of requests may provide rapid confirmation regarding whether the adverse condition exists.

In one embodiment, a change in operating mode from the standard operating mode 50S to one of the adverse operating modes may cause the request module 44 to initiate a confirmation procedure in which targeted requests 52 are transmitted to the managed device 24 as part of a sequence of confirmation requests. If the responses 70 to the confirmation requests indicate that the service data 58B values have returned to the standard range 38ES, the data evaluation module 46 may determine that the managed device 24 is operating normally and reinitiate the standard operating mode 50S of the monitoring policy 50. In one example, the request interval 62 may be increased from five minutes to an interval of three minutes, and the sequence of confirmation requests may comprise three targeted requests 52.

Turning to FIG. 7 while also referring to FIGS. 4-6 and FIG. 1A, the adverse operating modes of a monitoring policy 50 may also define management actions 102 to be initiated in response to changes in functional condition or service task conditions. The management actions 102 may include alerting users of the changes, or initiation of actions or steps to mitigate or avert adverse outcomes.

Management actions 102 may include the notification module 90 notifying users via platform alerts 94 displayed on the platform interface 18. For example, the notification module 90 may generate a platform alert 94 upon each detection of an adverse condition by the data evaluation module 46. The platform alert 94 may contain information which identifies the managed device 24 which is subject to the adverse condition. The platform alert 94 may also include data from the data log 78 which identifies and describes the adverse condition and further provides visualization of the relevant management data 58. The platform alert 94 may also provide static service data 58B such as serial number, firmware information, physical location data, or other types of data or information as required. The notification module 90 may also forward the content of platform alerts 94 using email, SMS, or a messaging or communication platform.

In one embodiment, as part of a management action 102, the remote monitoring server 12 or monitoring device 14 may cause a management command to be sent to the managed device 24 which instructs the managed device to undertake a managed device action. The managed device action may correspond to an action or function which is supported by the network management protocol 45 in use by the target network 20 and the managed device 24. For example, the management action 102 may instruct the managed device 24 to undergo a reset, reboot, or shut down sequence in order to mitigate an adverse condition. The management command may be relayed through the network management device 22 or be sent directly from the monitoring device 14 to the managed device 24 in accordance with the capabilities of the target network 20 and the network management protocol 45.

In certain embodiments, the management action 102 may cause the notification module 90 to transmit an external action command 98 to an external management system 100. The external management system 100 may be a system or platform with which the remote monitoring platform 10 can communicate via a unified operating framework 104 which provides interoperability between systems and a common automation platform for the execution of network functions and services. The unified operating framework 104 allows the external management system 100 to interpret and execute the external action command 98. An example of a unified operating framework 104 is the Open Network Automation Platform (ONAP).

In one embodiment, the external management system 100 controls one or more devices which are capable of carrying out automated actions which can mitigate the adverse condition. The external action command 98 may include external action parameters 98P which govern the execution of the automated action. For example, the external management system 100 may be a drone control system capable of receiving commands through the unified operation framework 104. In the present example, the monitored device 24 may be a moisture sensor, and the external action parameters 98P may be used to specify the physical location within the network site which is monitored by the managed device 24. In reaction to service data 58B from the managed device 24 indicating dangerously dry conditions at the physical location, the remote monitoring platform 10 causes the notification module 90 to transmit an external action command 98 to the drone controller which identifies the physical location. The drone control system may then execute the external action command 98 by directing a flight capable drone equipped with water dispensing equipment to fly to the physical location specified in the external action parameters 98P, and dispense water to mitigate the adverse condition. Note that the example provided above regarding the use of drones is merely illustrative and is not intended to limit the applicability or functionality of external action commands 98.

In certain embodiments, the monitoring policies 50 may initiate management actions 102 if confirmation requests initiated as part of a confirmation procedure indicate that the adverse condition persists. Furthermore, the monitoring policies 50 may specify a sequence of management actions 102 which are carried out if the adverse condition persists following the preceding management action 102 within the sequence. For example, a monitoring policy 50 may first cause a management command 102 to be sent which resets a managed device 24, followed by a platform alert 94 to initiate a maintenance request if the adverse condition persists following the resetting of the managed device 24.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a scalable monitoring platform. The disclosure is illustrated by example in the drawing figures, and throughout the written description. It should be understood that numerous variations are possible, while adhering to the inventive concept. Such variations are contemplated as being a part of the present disclosure.

What is claimed is:

1. A network monitoring system for monitoring a plurality of managed devices in a target network, comprising:
   a remote monitoring server;
   a monitoring device configured to communicate with a target network comprising a network management device and a plurality of managed devices, the monitoring device is co-located with the target network, and the remote monitoring server is configured to communicate with the monitoring device, wherein each of the plurality of managed devices stores management data comprising at least one of host data describing a functional condition of the managed device and service data describing a service task which the managed device is configured to carry out, the monitoring device comprising:
   a processor; and
   a non-transitory computer-readable storage media storing code, the code being executable by the processor to perform operations comprising:
      separately dynamically generating a plurality of targeted requests for management data corresponding to each of the plurality of managed devices;
      separately directly transmitting each of the plurality of targeted requests to the corresponding one of the plurality of managed devices via the network management device; and
      separately receiving, from each of the plurality of managed devices, the management data corresponding to the one of the plurality of managed devices;
   wherein the remote monitoring server is configured to identify a network management protocol used by the target network and cause the monitoring device to format each of the plurality of targeted requests to include network management commands native to the network management protocol;
   the remote monitoring server is further configured to retrieve at least one of configuration data corresponding to the target network, the management data corresponding to each of the plurality of managed devices, and address data which identifies each of the plurality of managed devices by a unique address;
   the remote monitoring server is further configured to locate device level identifiers associated with each of the plurality of targeted requests, wherein each device level identifier is associated with a subcomponent of one of the managed devices which is configured to gather raw service data;
   the remote monitoring server is further configured to retrieve the raw service data corresponding to one of the plurality of managed devices based on the device level identifier of the managed device, interpret the raw service data, and execute at least one protocol-agnostic monitoring policy with respect to at least one of the plurality of managed devices;
   the remote monitoring server is configured to detect, based on the management data, an adverse condition associated with one of the plurality of managed devices, and access the monitoring policy to determine at least one adverse operating mode associated with said managed device;
   the remote monitoring server is further configured to execute the at least one adverse operating mode and generate additional targeted requests for management data to said managed device at a predetermined frequency to verify the adverse condition; and
   the remote monitoring server is further configured to initiate at least one management action in response to verification of the adverse condition, the at least one management action comprising notifying a user of the adverse condition.

2. The network monitoring system of claim 1, wherein separately directly transmitting each of the plurality of targeted requests comprises transmitting each of the plurality of targeted requests in parallel.

3. A method for monitoring a plurality of managed devices in a target network having a network management device, comprising:
   storing, by each of a plurality of managed devices within a target network, management data comprising at least one of host data associated with a functional condition of the one of the plurality of managed devices and service data associated with a service task condition of the one of the plurality of managed devices;
   co-locating a monitoring device with the target network;
   providing a remote monitoring server, wherein the remote monitoring server is configured to communicate remotely with at least one of the monitoring device and the network management device;
   storing, by at least one of the remote monitoring server and the monitoring device, a monitoring policy associated with each of the plurality of managed devices, wherein the monitoring policy comprises at least one rule for evaluating the management data;
   separately dynamically generating a plurality of targeted requests for the management data corresponding to each of the plurality of managed devices, wherein each of the plurality of targeted requests corresponds to exactly one of the plurality of managed devices;
   separately directly transmitting, by the monitoring device, each of the plurality of targeted requests to the corresponding one of the plurality of managed devices via the network management device;
   separately receiving, in response to each of the plurality of targeted requests, the management data corresponding to each of the plurality of managed devices;
   detecting, based on the management data, an adverse condition associated with the corresponding one of the plurality of managed devices;
   accessing the monitoring policy to determine at least one adverse operating mode associated with the one of the plurality of managed devices;
   executing the at least one adverse operating mode;
   generating, in response to the at least one adverse operating mode, additional targeted requests for management data;
   transmitting, to the one of the plurality of managed devices, the additional targeted requests at a predetermined increased frequency to verify the adverse condition; and
   initiating, in response to verification of the adverse condition, at least one management action comprising notifying a user of the adverse condition.

4. The method of claim 3, further comprising identifying, via the remote monitoring server, a network management protocol used by the target network, and configuring each of the plurality of targeted requests to include network management commands native to the network management protocol.

5. The method of claim 4, further comprising:
  locating, via the remote monitoring server, device level identifiers associated with each of the plurality of targeted requests, wherein each of the device level identifiers is associated with a subcomponent configured to gather raw service data; and
  retrieving raw service data based thereon.

6. The method of claim 5, further comprising interpreting the raw service data to execute at least one protocol-agnostic monitoring policy with respect to at least one of the plurality of managed devices.

7. The method of claim 6, wherein detecting the adverse condition further comprises:
  evaluating the management data to detect a change in at least one of the functional condition and the service task condition of the one of the plurality of managed devices;
  identifying, based on the change, the adverse condition associated with the one of the plurality of managed devices; and
  comparing the management data corresponding to the one of the plurality of managed devices to a predetermined data range to assess a severity of the adverse condition.

8. The method of claim 3, wherein separately transmitting each of the targeted requests comprises dynamically scheduling transmission of each of the targeted requests to minimize a risk of the adverse condition.

* * * * *